Patented Nov. 21, 1950

2,530,372

UNITED STATES PATENT OFFICE 2,530,372

ALUMINUM PENICILLIN

Sidney W. Bohls, Austin, Tex., assignor to Hynson, Westcott & Dunning, Incorporated, a corporation of Maryland No Drawing. Application February 11, 1946, Serial No. 646,963

1 Claim. (Cl. 260—302)

The present invention relates to a penicillin preparation which is adapted for use for the oral administration of penicillin.

An object of the invention is to provide a penicillin preparation in which the penicillin is relatively stable under storage.

A further object of the invention is to provide a penicillin preparation from which the penicillin is absorbed into the blood streeam when administered orally and in which the penicillin is not destroyed by the conditions commonly encountered in the alimentary tract.

A further object of the invention is to provide a penicillin preparation which, when administered orally, will give a prolonged effect, that is, will give a therapeutic concentration of penicillin in the blood of the person or animal for a substantially longer period of time than when penicillin in the form of the highly water soluble salts thereof such as the sodium or calcium salt is administered parenterally.

It has been proposed heretofore to administer penicillin in the form of the highly water soluble salts suspended in various materials such as oils, beeswax, gelatin, pectin, globulin and adsorbed on aluminum hydroxide and in the form esters thereof in order to retard the liberation of the penicillin into the blood stream and its elimination from the body and thus to prolong the maintenance of a therapeutic blood level from a single dose.

I have found that I can prepare a sparingly soluble aluminum salt of penicillin and that said salt is not only relatively stable under storage and in the alimentary tract but that it gives a prolonged action. The aluminum salt of penicillin is prepared by simply reacting a water soluble salt of penicillin such as the sodium or calcium salts thereof with a water soluble aluminum salt, such as aluminum chloride or alum, thereby forming the relatively sparingly soluble aluminum salt of penicillin.

The following are illustrative examples of the preparation of the aluminum salt of penicillin:

Example 1

To 1 gm. of the crystalline sodium salt of penicillin G (approximately 1600 Oxford units/mgm.) in 4 cc. of water was added 4 cc. of a 10% solution of $AlCl_3.6H_2O$. The precipitate was collected on a fritted glass funnel and washed free of chlorides with small portions of water. After drying in vacuum over $CaCl_2$, it weighed 964 mgms. and was found to contain 2.7% aluminum indicating that it was the tri-penicillin salt of aluminum. The theoretical aluminum content of the aluminum salt of penicillin G is 2.63%. The precipitate is soluble in water to the extent of 0.38% and has approximately the same activity per mgm. as the sodium salt from which it was made. A determination of sodium in the combined filtrate and wash water indicated that all the sodium had been replaced by aluminum. A saturated solution of the aluminum salt has a pH of 3.7.

Example 2

1 gm. of calcium penicillin (340 Oxford units/mgm.) in 5 cc. of water required 20 cc. of a 2% solution of $AlK(SO_4)_2.12H_2O$ to completely precipitate it. The precipitate was filtered off and washed on a fritted glass funnel. The precipitate was dried in a vacuum desiccator over $CaCl_2$.

The precipitate weighed 425 mgms. and contained no calcium. It contained 3.66% Al indicating that it was the tri-penicillin salt of aluminum.

Example 3

1 gm. of same calcium penicillin, as in Example 2, in 5 cc. of water required 12 cc. of a 2% solution of $AlCl_3.6H_2O$ to completely precipitate it. The precipitate was washed on the filter with 10 cc. of water.

The precipitate weighed 560 mgms. and contained 3.45% Al indicating that it was the tri-penicillin salt of aluminum. It was very soluble in sodium bicarbonate solution and only 0.3% soluble in tenth normal HCl. Its activity was about 335 Oxford units/mgm.

Aluminum penicillin prepared from the crude calcium penicillin salt has been found to be soluble in water to the extent of about .5%.

In the foregoing examples I have illustrated the use of sodium and calcium penicillin as the water soluble salt of penicillin with aluminum chloride and potassium aluminum alum as the source of the aluminum but the process is applicable generally to water soluble salts of penicillin and aluminum.

In practice, particularly when the aluminum penicillin salt is to be administered by mouth, it need not be pure, i. e., free of other reaction products such as the sodium chloride or sulfate or calcium chloride or sulfate formed when sodium or calcium penicillin is reacted with chloride or sulfate of aluminum. Separation of the aluminum penicillin from the reaction mixture and washing the precipitate to free it of such by-products of the reaction results in loss of penicillin in the filtrate and washings and it is preferable therefore to precipitate the aluminum penicillin in the presence of a minimum of water and simply to dry the whole reaction mixture. This may be accomplished without loss of penicillin by freezing the reaction mixture and dehydrating the frozen product under high vacuum.

The product whether in the form of the pure aluminum salt of penicillin formed by precipitation and separation from the reaction mixture by filtration and washing or in the form of the reaction mixture or partially purified may be administered by subcutaneous or intramuscular injection or by mouth and gives a prolonged effect in either case.

This invention is primarily concerned with a penicillin preparation adapted for oral administration and I shall therefore describe the preparation of tablets suitable for that purpose.

An amount of penicillin calcium or sodium salt sufficient to contain the desired number of units, depending upon the assay of the salt, is weighed out and dissolved in about 2 to 3 times its weight of distilled water. In order to allow for some possible loss of activity it is preferred to use an excess of about 10% of the penicillin salt. An amount of alum, $KAl(SO_4)_2.12H_2O$, amounting to 2 milligrams of the alum for each 2500 Oxford units in the penicillin salt is dissolved in distilled water. The alum solution is slowly added to the penicillin solution with constant agitation. A flocculent yellow amorphous precipitate forms. This precipitate may be separated and recovered for use but I prefer to freeze the entire reaction mixture and dehydrate it under vacuum. The resulting amorphous product may be used directly for parenteral injection but preferably is incorporated into tablets of suitable size, that is, containing the desired number of Oxford units of penicillin per tablet for administration by mouth. The precipitate or the evaporated residue of the reaction mixture has an antibacterial action similar to that of penicillin. The penicillin activity is, however, more stable under storage, more heat resistant, more resistant to destruction by acid of the concentration encountered in the human stomach and is more slowly eliminated from the blood of humans or animals to which it is given and consequently permits the development and maintenance of a desired therapeutic blood level for a longer period of time with less frequent administration than when a readily soluble salt of penicillin such as sodium or calcium salt is administered by mouth or parenterally. Whereas it has been found to be impossible to maintain a therapeutic blood level with a readily soluble penicillin salts when administered at intervals greater than two hours I have found that a therapeutic blood level may be maintained with the administration of the aluminum penicillin at intervals of from 6 up to 24 hours.

To make tablets suitable for oral use the penicillin-alum reaction product described above in finely powdered form is uniformly mixed with sucrose and lactose granules or other suitable granulation mix and the mixture pressed into the form of tablets of the desired size.

The penicillin potency of the tablets has been found to be quite stable in storage but preferably the tablets are stored in a refrigerator. Clinical tests in which the amount of penicillin administered was compared with the amount of penicillin excreted indicate that the penicillin is quite stable in the alimentary tract and is efficiently absorbed or transferred to the blood. The penicillin activity of the tablets is more resistant to destruction by heat and by acid than is the penicillin of its soluble salts such as the sodium and calcium salts.

The stability of the penicillin in storage and its stability in the alimentary tract, the efficiency of its transfer to the blood and its relatively slow elimination all contribute to the conservation of the penicillin which is a relatively costly material and to the ease with which therapeutic blood levels are established and maintained.

Clinical tests indicate that a single dose of penicillin in the form of a tablet or tablets as described above made of the penicillin-alum reaction product or an equivalent amount of the more or less pure aluminum penicillin salt amounting to 100,000 units usually will maintain a therapeutic blood level of .035 unit per cc. of blood serum for from 6 up to 24 hours. Divided doses, of say 50,000 to 100,000 units three times daily, advantageously might be used. Similar results are obtained by subcutaneous or intramuscular injection of the aluminum salt.

It will be appreciated that an aluminum-penicillin reaction product may be provided in which the penicillin is only partly in the form of aluminum penicillin salt by the addition to a solution of a readily water soluble salt of penicillin such as the sodium or calcium salt of an amount of a soluble aluminum salt such as the chloride or sulfate or alum which is insufficient to convert all of the penicillin into its aluminum salt. Furthermore, an excess of the aluminum salt may be added.

The crystalline sodium salt of penicillin used in Example 1 was, as indicated in said example, the sodium salt of penicillin G. The calcium salts used in Examples 2 and 3 and numerous other batches of water-soluble salts of penicillin used in the preparation of the aluminum salt of penicillin in accordance with my invention were commercial products obtained from several American manufacturers, which commercial products contained mixtures of various penicillin types, predominantly penicillin G.

I claim:

As a new product the tri-penicillin G salt of aluminum.

SIDNEY W. BOHLS.

REFERENCES CITED

The following references are of record in the file of this patent:

UNITED STATES PATENTS

| Number | Name | Date |
| --- | --- | --- |
| 1,846,880 | Kussmal | Feb. 23, 1932 |
| 2,360,388 | Berger | Oct. 17, 1944 |
| 2,438,106 | Alburn et al. | Mar. 23, 1948 |
| 2,449,039 | Libby | Sept. 7, 1948 |
| 2,464,053 | Omohundro et al. | Mar. 8, 1949 |

FOREIGN PATENTS

| Number | Country | Date |
| --- | --- | --- |
| 21,461 | Great Britain | 1906 |
| 170,911 | Great Britain | Oct. 20, 1921 |

OTHER REFERENCES

Abraham: British Journal of Experimental Pathology, vol. 23, June 1942, pp. 103–114.

J. American Med. Assoc., May 12, 1945, pp. 83–87.

Science, June 15, 1945, pp. 618–619.

J. American Med. Assoc., July 21, 1945, pp. 845–847.

Science, Sept. 7, 1945, pp. 247–250.

Texas State J. Medicine, Sept. 1945, pp. 249–251.